(12) United States Patent
Nam et al.

(10) Patent No.: US 12,031,926 B2
(45) Date of Patent: Jul. 9, 2024

(54) MESH-BASED CRYSTAL SAMPLE HOLDER FOR SERIAL CRYSTALLOGRAPHY

(71) Applicants: Korea University Research and Business Foundation, Seoul (KR); POSTECH RESEARCH AND BUSINESS DEVELOPMENT FOUNDATION, Pohang-si (KR)

(72) Inventors: Ki Hyun Nam, Seoul (KR); Yunje Cho, Pohang-si (KR)

(73) Assignees: Korea University Research and Business Foundation, Seoul (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 378 days.

(21) Appl. No.: 17/426,183

(22) PCT Filed: Jan. 29, 2020

(86) PCT No.: PCT/KR2020/001315
§ 371 (c)(1),
(2) Date: Jul. 28, 2021

(87) PCT Pub. No.: WO2020/159209
PCT Pub. Date: Aug. 6, 2020

(65) Prior Publication Data
US 2022/0091055 A1    Mar. 24, 2022

(30) Foreign Application Priority Data
Jan. 30, 2019 (KR) .......................... 10-2019-0012183

(51) Int. Cl.
*G01N 23/20025* (2018.01)
*G01N 1/36* (2006.01)

(52) U.S. Cl.
CPC ......... *G01N 23/20025* (2013.01); *G01N 1/36* (2013.01); *G01N 2223/056* (2013.01)

(58) Field of Classification Search
CPC ............... G01N 23/20025; G01N 1/36; G01N 2223/056
See application file for complete search history.

(56) References Cited

U.S. PATENT DOCUMENTS

| 5,528,646 A | 6/1996 | Iketaki et al. |
| 2009/0046832 A1* | 2/2009 | Birnbaum .......... G01N 23/2204 378/45 |

(Continued)

FOREIGN PATENT DOCUMENTS

| JP | 8-247966 A | 9/1996 |
| JP | 2008-249465 A | 10/2008 |

(Continued)

OTHER PUBLICATIONS

Masaru et al., JP 2008-249465 A, with English translation (Year: 2008).*

(Continued)

*Primary Examiner* — Chih-Cheng Kao
(74) *Attorney, Agent, or Firm* — NSIP Law

(57) ABSTRACT

The present invention relates to a sample holder on which a crystal sample for serial crystallography is mounted, or the like. Compared to an existing sample holder, the sample holder according to the present invention can be manufactured by a very simple manufacturing process and at low costs, and does not physically and chemically affect other equipment therearound while collecting X-ray diffraction data. Therefore, it is possible to stably operate a beam line, to increase beam time efficiency, and further to perform raster scanning so that many diffraction images can be obtained even in a small-sized chip. In addition, since the problem of evaporation of a crystallized solution does not (Continued)

occur even when the crystallized solution is stored in the air for a long time, the sample holder is generally easy to use compared to a previously reported sample holder. Therefore, it is expected that the sample holder is very likely to be variously applied to the fixed-target serial crystallographic research field using various samples.

16 Claims, 10 Drawing Sheets

(56) References Cited

U.S. PATENT DOCUMENTS

| | | |
|---|---|---|
| 2012/0294885 A1 | 11/2012 | David et al. |
| 2013/0336996 A1 | 12/2013 | Vernejoul et al. |
| 2018/0273560 A1 | 9/2018 | Bazin-Lee et al. |
| 2018/0362560 A1 | 12/2018 | Bazin-Lee et al. |
| 2019/0346384 A1* | 11/2019 | Matsuda ............... G01N 23/223 |

FOREIGN PATENT DOCUMENTS

| | | |
|---|---|---|
| JP | 2018-205290 A | 12/2018 |
| KR | 10-2012-0046601 A | 5/2012 |

OTHER PUBLICATIONS

Hunter et al., "Fixed-target protein serial microcrystallography with an x-ray free electron laser", Scientific Reports, vol. 4, from the internet: <<https://www.nature.com/articles/srep06026>>. (Year: 2014).*

Ignacio, Bob J., et al., "Toll-Like Receptor Agonist Conjugation: A Chemical Perspective," *Bioconjugate chemistry*, 29, 3, 2018 (pp. 587-603).

Wilkinson, Alexander, et al., "Lipid conjugation of TLR7 agonist Resiquimod ensures co-delivery with the liposomal Cationic Adjuvant Formulation 01 (CAF01) but does not enhance immunopotentiation compared to non-conjugated Resiquimod+ CAF01," *Journal of Controlled Release*, 291, 2018 (pp. 1-10).

International Search Report issued on May 18, 2020 in counterpart International Patent Application No. PCT/KR2020/001315 (2 pages in English and 2 pages in Korean).

Written Opinion issued on May 18, 2020 in counterpart International Patent Application No. PCT/KR2020/001315 (6 pages in Korean).

* cited by examiner

MESH-BASED CRYSTAL SAMPLE HOLDER FOR SERIAL CRYSTALLOGRAPHY

CROSS REFERENCE TO RELATED APPLICATIONS

This application is a U.S. National Stage Application of International Application No. PCT/KR2020/001315, filed on Jan. 29, 2020, which claims the benefit under 35 USC 119(a) and 365(b) of Korean Patent Application No. 10-2019-0012183, filed on Jan. 30, 2019, in the Korean Intellectual Property Office, the entire disclosure of which is incorporated herein by reference for all purposes.

TECHNICAL FIELD

The present invention relates to a sample holder for loading a crystal sample for serial crystallography, a method of manufacturing the same, and a method of preparing a sample for a serial crystallography experiment using the sample holder.

This application claims priority to and the benefit of Korean Patent Application No. 10-2019-0012183, filed on Jan. 30, 2019, the disclosure of which is incorporated herein by reference in its entirety.

BACKGROUND ART

X-ray crystallography is an experimental technique for obtaining a high-resolution three-dimensional structure based on a diffraction signal generated by transmitting X-rays through a crystal sample such as a protein, nucleic acid or small molecule. To obtain the high-resolution crystal structure, a high luminance X-ray source provided by a synchrotron or X-ray free electron laser (XFEL) is used. To collect X-ray diffraction data, a diffraction signal generated by delivering crystals to a path along which the X-ray of an accelerator beamline passes is recorded with a detector.

In a synchrotron, generally, after a crystal sample is mounted in a nylon loop or a glass capillary, it is connected to the goniometer installed at a beamline and moved along the X and Y axes to an X-ray focusing position. In addition, X-ray diffraction data was collected by rotating the goniometer during data collection for obtaining a three-dimensional structure. Meanwhile, when a crystal sample is small or X-rays with high luminance are focused through a mirror device, the crystal sample may be damaged by radiation, which may lower a diffraction intensity and make it difficult to collect sufficient data for determining the structure. To solve this problem, there is a method for identifying a three-dimensional structure by serially exposing multiple crystal samples to X-rays to collect diffraction datas, and combining the data of diffraction images obtained from the multiple crystals into one, which is referred to as serial crystallography. That is, serial crystallography is an advanced form of conventional X-ray crystallography.

In the case of a $3^{rd}$ generation synchrotron microbeam line, there is a case in which a small crystal sample is mounted on a nylon loop, and fixed with a low-temperature (100K) liquid nitrogen gas to collect diffraction data, but since there may be a biological difference between the low-temperature crystal structure and a protein structure present at room temperature, it is important to collect diffraction data at room temperature. However, in data collection at room temperature, crystals on the nylon loop settle due to gravity, and are not uniformly distributed.

On the other hand, XFEL is a powerful X-ray source which is 10 to 10 billion times brighter than conventional radiation, and has a pulse width of several tens of femtoseconds. Since the pulse width of XFEL is shorter than the time to damage a material by X-rays, XFEL has an advantage of visualizing the crystal structure of molecules at room temperature without radiation damage. However, because of the use of X-rays with a high luminance, crystal samples are damaged after XFEL transmission. For this reason, crystal samples are serially provided to an X-ray path, and diffraction data on 3D structure information is collected with the multiple crystal samples, and thus the serial crystallography technique using XFEL is called serial femtosecond crystallography (SFX). Since crystal data is obtained from SFX at room temperature, to serially deliver crystal samples to an X-ray path, a novel sample delivery system is needed. To serially deliver a large number of crystal samples, various sample delivery methods such as a liquid jet sample injector, an electrospinning injector, a lipidic cubic phase (LCP) injector, and an acoustic injector have been developed. Among these methods, fixed-target serial femtosecond crystallography (FT-SFX) is a method in which crystal samples are mounted on specific chips, the chips are placed on X and Y stages, and diffraction data is collected while scanning along the X-ray path, and has an advantage of dramatically lowering a crystal sample consumption rate.

Most FT-SFX research using XFEL uses a silicon chip as a sample holder fixing a crystal sample, the designed silicon chip has holes with a predetermined size, which are regularly spaced apart, and the inside of the chip hole is surface-treated such that the crystals can be stably loaded. The sample holder may be placed on X and Y stages of a sample chamber, and an experiment is designed so that an XFEL pulse passes through each hole in the silicon chip by stage control, and the crystal sample placed in the hole produces a diffraction pattern by a low level of background scattering, but in FT-SFX scans using silicon chips, when XFEL penetrates a surrounding silicon material without passing through a chip hole. XFEL may cause physical damage to a detector. For this reason, it is necessary to precisely process holes in the silicon chip to ensure correct positions and sizes, and it is also important to align the silicon chip in a holder of the stage on which the chip will be mounted at a precise position and angle. As a result, the FT-SFX research using a silicon chip consumes a lot of money and time in precise chip manufacturing and equipment alignment processes during preparation, and there are concerns about detector damage every time experiments are performed. However, there is a case of collecting diffraction data by placing a crystal sample between Mylar films, but it is difficult to effectively collect data due to sinking of a crystal sample in the direction of gravity.

Therefore, to collect diffraction data at room temperature, in a conventional $3^{rd}$ generation light source, the crystal sample should be uniformly fixed, and the FT-SFX using XFEL requires the development of a convenient sample fixing and delivery method to facilitate an experimental approach.

DISCLOSURE

Technical Problem

The inventors had earnestly studied to solve the problem of a conventional sample holder used in an FT-SFX experiment using XFEL, as a result, a sample holder using a mesh structure through which X-rays are transmitted without refraction and which does not affect data analysis was completed.

Therefore, the present invention is directed to providing a sample holder for loading a crystal sample for serial crystallography, which comprises:

a first film cover which comprises a frame enclosing a first sample evaporation preventing film;

a mesh structure in which mesh pores are formed to carry and fix a crystal sample; and a second film cover including a frame enclosing a second sample evaporation preventing film.

However, technical problems to be solved in the present invention are not limited to the above-described problems, and other problems which are not described herein will be fully understood by those of ordinary skill in the art from the following descriptions.

Technical Solution

To attain the purpose of the present invention, the present invention provides a sample holder for loading a crystal sample for serial crystallography, which comprises:
- a first film cover which comprises a frame enclosing a first sample evaporation preventing film;
- a mesh structure in which mesh pores are formed to carry and fix a crystal sample; and
- a second film cover including a frame enclosing a second sample evaporation preventing film.

In addition, the present invention provides a method of preparing a sample for a serial crystallography experiment, which comprises:
- (a) preparing a mesh structure in which a sample is carried to be positioned on the top of a first film cover, and
- (b) sealing the mesh structure in step (a) by fixing a second sample evaporation preventing film of the second film cover and the frame of the first film cover in step (a) with an adhesive member.

In addition, the present invention provides a method of preparing a sample holder, which comprises:
- (a) preparing a first film cover having a frame enclosing a first sample evaporation preventing film, a second film cover having a frame enclosing a second sample evaporation preventing film, and a mesh structure in which mesh pores for carrying and fixing a crystal sample are formed; and
- (b) placing the mesh structure in step (a) between the first film cover and the second film cover.

In one embodiment of the present invention, in the first film cover and the second film cover, the sample evaporation preventing films and the frames enclosing the films may be fixed with an adhesive member.

In another embodiment of the present invention, the adhesive member is capable of double-sided adhesion.

In still another embodiment of the present invention, the double-sided adhesive member may be a polyimide tape.

In yet another embodiment of the present invention, the mesh structure may be included between the first film cover and the second film cover.

In yet another embodiment of the present invention, the frame of the first film cover may be placed on the upper part of the first sample evaporation preventive film, and the mesh structure may be placed in the frame of the first film cover.

In yet another embodiment of the present invention, a material for the sample holder may be a material that transmits X-rays.

In yet another embodiment of the present invention, the sample holder may have a width of 20 to 50 mm, a length of 20 to 50 mm, and a thickness of 1 to 5 mm.

In yet another embodiment of the present invention, the material for the mesh structure may be one or more materials selected from the group consisting of nylon, polyester, polypropylene, polyetheretherketone, stainless steel, and ethylene-co-tetrafluoroethylene.

In yet another embodiment of the present invention, the mesh pores formed in the mesh structure may have a size of 10 to 200 μm.

In yet another embodiment of the present invention, a material for the sample evaporation preventing film may be one or more materials selected from the group consisting of polyimide, polyethylene terephthalate, polyetheretherketone, poly(4,4'-oxydiphenylene-pyromellitimide) and biaxially-oriented polyethylene terephthalate (BoPET).

In yet another embodiment of the present invention, the sample evaporation preventing film may have a thickness of 100 nm to 30 μm.

In yet another embodiment of the present invention, a material for the frame may be one or more materials selected from the group consisting of polyvinyl chloride (PVC), polyethylene terephthalate (PET), polyester, and vinyl.

In yet another embodiment of the present invention, the frame may have a thickness (depth) of 0.1 to 0.5 mm.

In yet another embodiment of the present invention, a crystal sample carried in the sample holder may be one or more selected from the group consisting of a protein crystal, a nucleic acid crystal, a nano crystal, and a small molecule crystal.

In yet another embodiment of the present invention, the sample holder may be used in a fixed-target serial femtosecond crystallography (FT-SFX) experiment using X-Ray Free-Electron Laser (XFEL) or a fixed-target serial millisecond crystallography (FX-SMX) experiment using synchrotron X-rays.

Advantageous Effects

A sample holder of the present invention can be manufactured by a very simple process at low cost, compared to a conventional sample holder, and since the sample holder uses a material that transmits X-rays, while collecting X-ray diffraction data from an accelerator beamline, there is no physical or chemical effect on other equipment in the vicinity. Therefore, since the beamline can be stably operated, beamline efficiency can be increased, and further, since scattering from a mesh does not affect diffraction data processing, as raster scanning is possible, many diffraction images can be obtained with a small-sized chip, thereby increasing space utilization inside a sample chamber. In addition, since the sample holder is sealed by a film, there is no problem of evaporation of a crystallization solution even when stored in air for a long time. In addition, the sample holder can be arbitrarily installed in any device including X and Y stages to collect diffraction data. As a result, since it is generally easier to use the sample holder of the present invention than a previously reported sample holder, it is expected that the sample holder of the present invention is highly likely to be applied in various fields of fixed-target serial crystallography research using various samples.

DESCRIPTION OF DRAWINGS

FIGS. 8A and 8B show electron density maps identified using a sample holder of the present invention, in which FIG. 8A is a result using a lysozyme sample and FIG. 8B is a result using glucose isomerase.

MODES OF THE INVENTION

Figure 1:
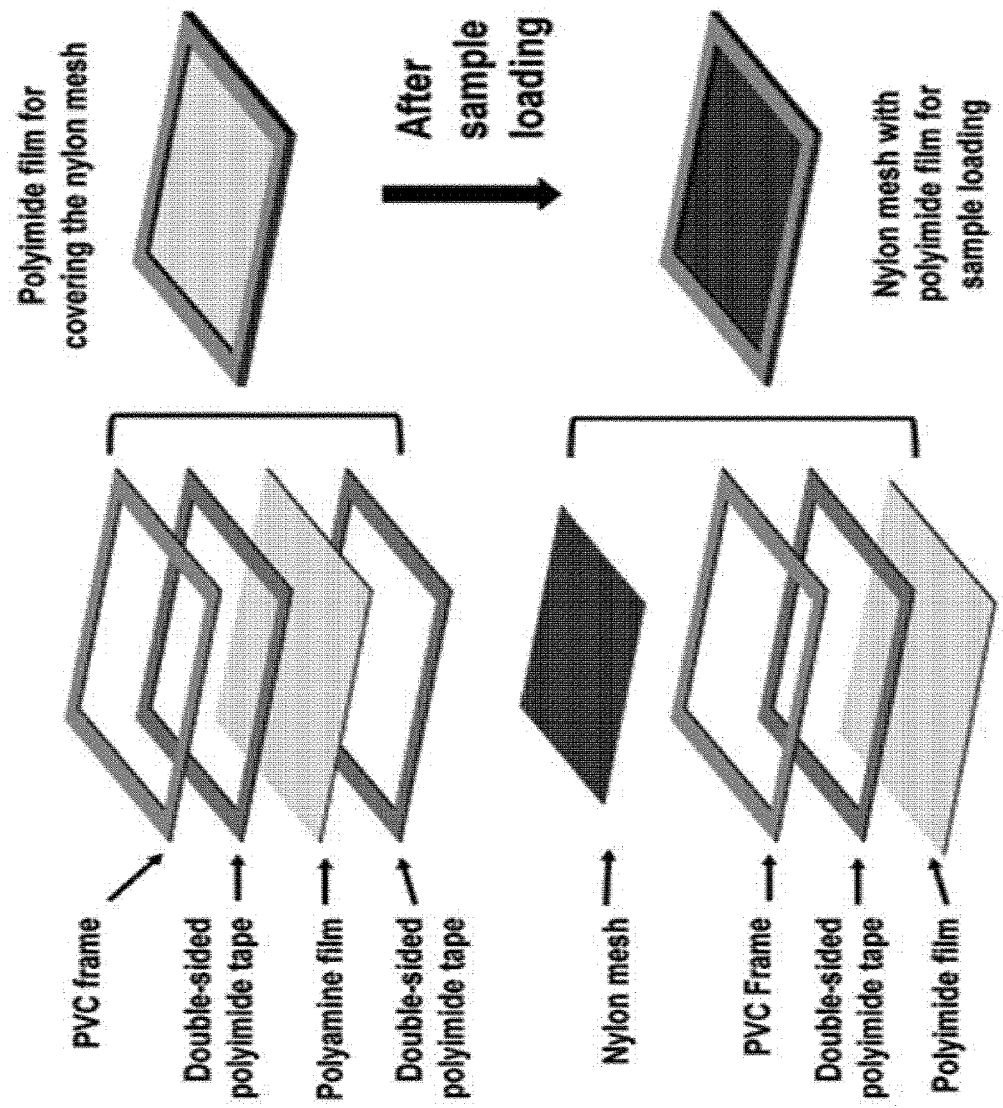
FIG. 1 schematically shows the configuration of a nylon mesh-based crystal sample holder.

As a result of the inventors earnestly studying to solve the problems of a conventional sample holder used in an FT-SFX experiment using XFEL, a sample holder using a mesh structure which transmits X-rays without refraction and does not affect data analysis was completed.

Specifically, in the present invention, a mesh structure of a material with a low scattering intensity, which transmits X-rays without refraction and does not affect data analysis, was used as a sample holder. Compared to a conventional sample holder, the sample holder can be manufactured by a very simple process at low cost, and the mesh structure can carry and fix a sample due to pores formed therein. In addition, since the material transmitting X-rays is used, it does not have a physical or chemical effect on other equipment in the vicinity while X-ray diffraction data is collected from an accelerator beamline, and scattering generated in the mesh does not affect diffraction data processing, so raster scanning is possible, thereby obtaining many diffraction images with a small-sized chip.

In addition, in the present invention, a sample evaporation preventing film was used. Since the sample holder is sealed by the film, a crystallization solution is not evaporated even being stored in air for a long time. Meanwhile, in other conventional studies, a humidity control device may be used to prevent the damage to a crystal sample due to the evaporation of a crystal solution, but in this case, there may be a problem in that the information on the alignment of the sample in the crystal may be changed. However, the currently developed sample holder does not have such a problem at all.

In addition, the present invention uses a frame. The frame serves to maintain the sample holder of the present invention in a certain shape, make the manipulation of the sample holder convenient, and prevent the mesh structure from being moved in the sample holder during the experiment since the mesh structure can be placed in the frame.

In one embodiment of the present invention, it was confirmed that a mesh-based crystal sample holder can be manufactured by the method of manufacturing a sample holder of the present invention (see Example 1).

In another embodiment of the present invention, it was confirmed that the sample may be uniformly distributed in the mesh structure when the sample is loaded in the sample holder of the present invention (see Example 2).

In still another embodiment of the present invention, it was confirmed that, when XFEL penetrates into the sample holder of the present invention, a pore is formed on the surface of a polyimide film, and bubbles are generated in the polyimide film (see Example 3).

In yet another embodiment of the present invention, as a result of collecting X-ray diffraction data by loading lysozyme or glucose isomerase in the sample holder of the present invention, it was confirmed that an electron density map is very clearly observed (see Example 4).

In yet another embodiment of the present invention, as a result of analyzing background scattering of a nylon material, it was confirmed that the scattering intensity is at a low level that does not affect data processing (see Example 5).

Hereinafter, the present invention will be described in detail.

The present invention provides a sample holder for loading a crystal sample for serial crystallography, which comprises:
- a first film cover which have a frame enclosing a first sample evaporation preventing film;
- a mesh structure in which a mesh pore for carrying and fixing a crystal sample is formed; and
- a second film cover having a frame enclosing a second sample evaporation preventing film.

In the present invention, in the first film cover and the second film cover, the sample evaporation preventing films and the frames enclosing the films may be fixed with an adhesive member.

In the present invention, the adhesive member may be capable of double-sided adhesion, but the present invention is not limited thereto.

In the present invention, the adhesive member capable of double-sided adhesion may be a polyimide tape, but the present invention is not limited thereto, and serve to fix the sample evaporation preventing films and the frames enclosing the films. Any material that transmits X-rays may be included.

In the present invention, the frame of the first film cover may be located on the upper part of the first sample evaporation preventing film, and the mesh structure may be located inside of the frame of the first film cover, but the present invention is not limited thereto, and a part of the mesh structure may be located outside the frame within a range that does not affect the sealing of the sample holder.

In the present invention, a material for the sample holder may be a material that transmits X-rays. This is to prevent physical damage to a detector, which is caused by refraction of X-rays during collisions with the sample holder.

In the present invention, the sample holder may have a width of 20 to 50 mm, a length of 20 to 50 mm and a thickness of 1 to 5 mm, but the present invention is not limited thereto. The dimensions of the sample holder may vary according to an experimental subject and purpose. In addition, there is no limitation on the shape of the sample holder as long as it does not interfere with performing a serial crystallography experiment, but the shape may be circular, oval, fan-shaped or polygonal, and preferably, tetragonal.

In the present invention, the material for the mesh structure may be one or more materials selected from the group consisting of nylon, polyester, polypropylene, polyetheretherketone, stainless steel, and ethylene-co-tetrafluoroethylene, but the present invention is not limited thereto, and any material which forms a mesh structure such that a crystal sample can be carries, and transmits X-rays may be used without limitation.

In the present invention, the size of a mesh pore formed in the mesh structure may be 10 to 200 µm, but the present invention is not limited thereto. The mesh pore size may vary without limitation according to the size of a crystal used in the experiment.

In the present invention, the mesh structure may have a width of 20 to 40 mm, a length of 20 to 40 mm, and a thickness of 1 to 3 mm, but the present invention is not limited thereto. The size may vary according to an experimental subject and purpose. In addition, there is no limitation on the shape of the sample holder as long as it does not interfere with performing a serial crystallography experiment, but the shape may be circular, oval, fan-shaped or polygonal, and preferably, the same shape as the sample holder.

In the present invention, a material for the sample evaporation preventing film may be one or more materials selected from the group consisting of polyimide, polyethylene terephthalate, polyetheretherketone, poly(4,4'-oxydiphenylene-pyromellitimide) and biaxially-oriented polyethylene terephthalate (BoPET; Mylar), but the present invention is not limited thereto. Any material that can prevent sample evaporation when a sample is sealed with the film and transmit X-rays may be used without limitation.

In the present invention, the sample evaporation preventing film may have a thickness of 100 nm to 30 µm, but the present invention is not limited thereto. The sample evaporation preventing film may be formed with any thickness that can prevent the evaporation of a sample when sealing the sample with the film, and transmit X-rays.

In the present invention, the sample evaporation preventing film may have a width of 20 to 50 mm and a length of 20 to 50 mm, but the present invention is not limited thereto. The size of the sample evaporation preventing film may vary according to the size of a sample holder, frame or mesh structure. In addition, there is no limitation on the shape of the sample evaporation preventing film as long as it does not interfere with performing a serial crystallography experiment, but the shape may be circular, oval, fan-shaped or polygonal, and preferably, the same shape as the sample holder.

In the present invention, a material for the frame may be one or more materials selected from the group consisting of polyvinyl chloride (PVC), polyethylene terephthalate (PET), polyester, and vinyl, but the present invention is not limited thereto. To carry out the experiment, the sample holder may be formed of any material that can transmit X-rays while having a sufficient hardness to maintain the shape of the sample holder.

In the present invention, the thickness of the frame may be, but is not limited to, 0.1 to 0.5 mm, and may vary without limitation according to the thickness of the mesh structure.

In the present invention, the frame may have a size of 20 to 50 mm×20 to 50 mm, and a thickness of 0.1 to 0.5 mm, but the present invention is not limited thereto. The frame dimensions may vary according to the size of a sample holder, a sample evaporation preventing film or a mesh structure. In addition, there is no limitation on the shape of the sample evaporation preventing film as long as it does not interfere with performing a serial crystallography experiment, but the shape may be circular, oval, fan-shaped or polygonal, and preferably, the same shape as the sample holder.

In the present invention, a crystal sample carried in the sample holder may be one or more selected from the group consisting of a protein crystal, a nucleic acid crystal, a nano crystal and a small molecule crystal, but the present invention is not limited thereto, and any sample that can be used in X-ray analysis may be included.

The sample holder in the present invention may be used in a fixed-target serial femtosecond crystallography (FT-SFX) experiment using X-Ray Free-Electron Laser (XFEL) or a fixed-target serial millisecond crystallography (FX-SMX) experiment using synchrotron X-rays, but the present invention is not limited thereto.

In another aspect of the present invention, the present invention provides a method of preparing a sample for a serial crystallography experiment, which comprises:
  (a) preparing a mesh structure in which a sample is carried to be positioned on the top of a first film cover, and
  (b) sealing the mesh structure in step (a) by fixing a second sample evaporation preventing film of the second film cover and the frame of the first film cover in step (a) with an adhesive member.

In still another aspect of the present invention, the present invention provides a method of preparing the sample holder, which comprises:
  (a) preparing a first film cover having a frame enclosing a first sample evaporation preventing film, a second film cover having a frame enclosing a second sample evaporation preventing film, and a mesh structure in which mesh pores for carrying and fixing a crystal sample are formed; and
  (b) placing the mesh structure in step (a) between the first film cover and the second film cover.

In the specification, when one component "comprises" another component, this means that, unless specifically stated otherwise, other components may be further included, rather than excluded. The term "approximately" or "substantially" used herein are used at, or in the sense of proximity to, numerical values when manufacturing and material tolerances, which are inherent in the meanings, indicated are provided. This term is used to prevent the unfair use of the disclosures in which correct or absolute values are cited to help in understanding the present invention by unscrupulous infringers. The term "step to ~" or "step of ~" used herein does not mean a "step for ~."

Throughout the specification, the term "combination thereof" included in the Markush-type expression refers to a mixture or combination of one or more selected from the group consisting of constituents described in the Markush-type expression, that is, one or more selected from the group consisting of the components.

The expression "A and/or B" used herein means "A or B, or A and B".

When one embodiment is implemented otherwise, a specific step may be performed in a different order from being described. For example, two steps described in succession may be performed substantially at the same time, and may be performed in an opposite order to the order described.

Hereinafter, to help in understanding the present invention, exemplary examples will be suggested. However, the following examples are merely provided to more easily understand the present invention, and not to limit the present invention.

EXAMPLES

Example 1. Manufacture of Mesh-Based Sample Holder

Figure 2:
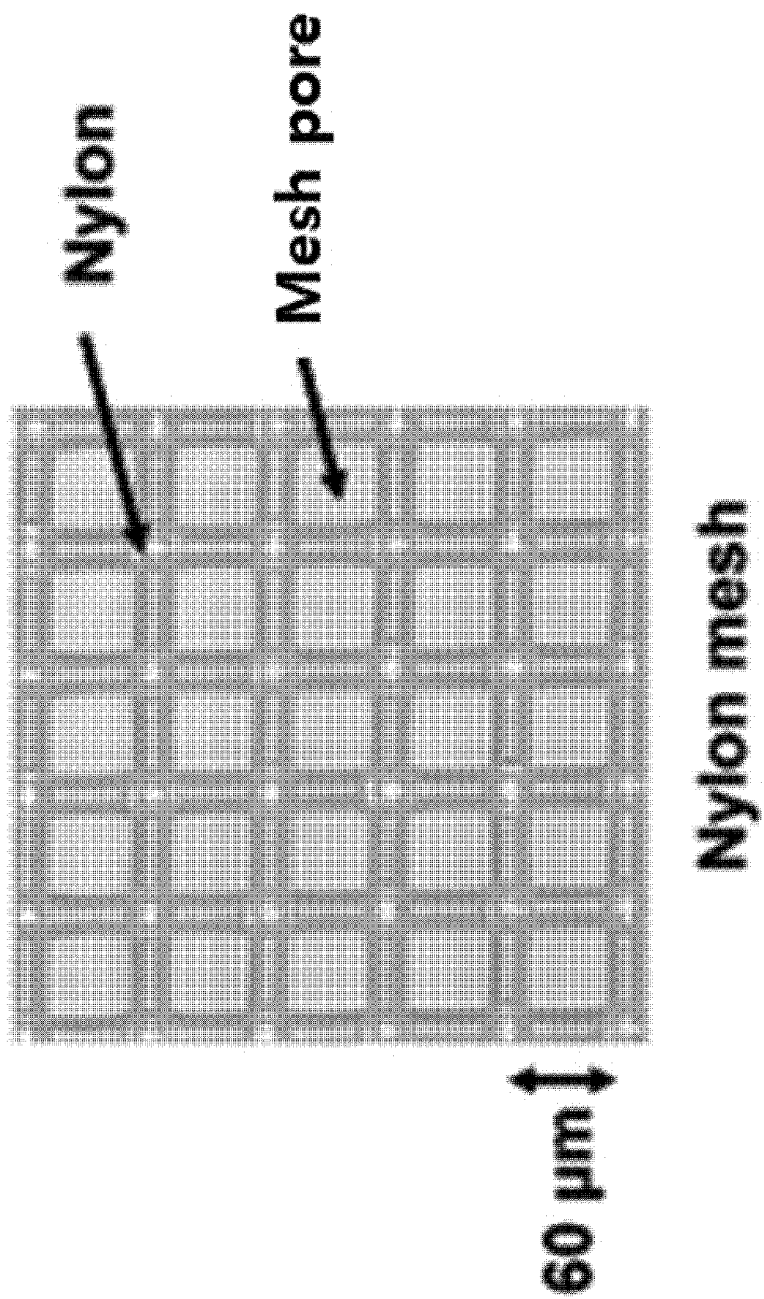
FIG. 2 shows the structure of a nylon mesh of the present invention used in an FT-SFX experiment.

In the present invention, a sample holder was manufactured based on a nylon mesh, a polyimide film was used to prevent the evaporation of a crystallization solution. The manufacture of a mesh-based sample holder is briefly introduced in FIG. 1, and the detailed procedure is as follows.
1) The entire size of the nylon-based sample holder was 30 mm×30 mm (width×length).
2) To facilitate the manipulation of the sample holder, a 30×30 mm PVC frame with a width of 5 mm and a thickness of 0.3 mm was manufactured.
3) A 30×30 mm polyimide film with a thickness of 25 μm was prepared to prevent the evaporation of a crystal solution.
4) A nylon mesh with a size of 20×20 mm was prepared to be introduced into the PVC frame, and a mesh pore was 60 μm (see FIG. 2).
5) A film cover was manufactured by adhering the PVC frame and the polyimide film with a double-sided polyimide tape.
6) The nylon mesh was placed inside the PVC frame of the manufactured film cover.

Figure 3:
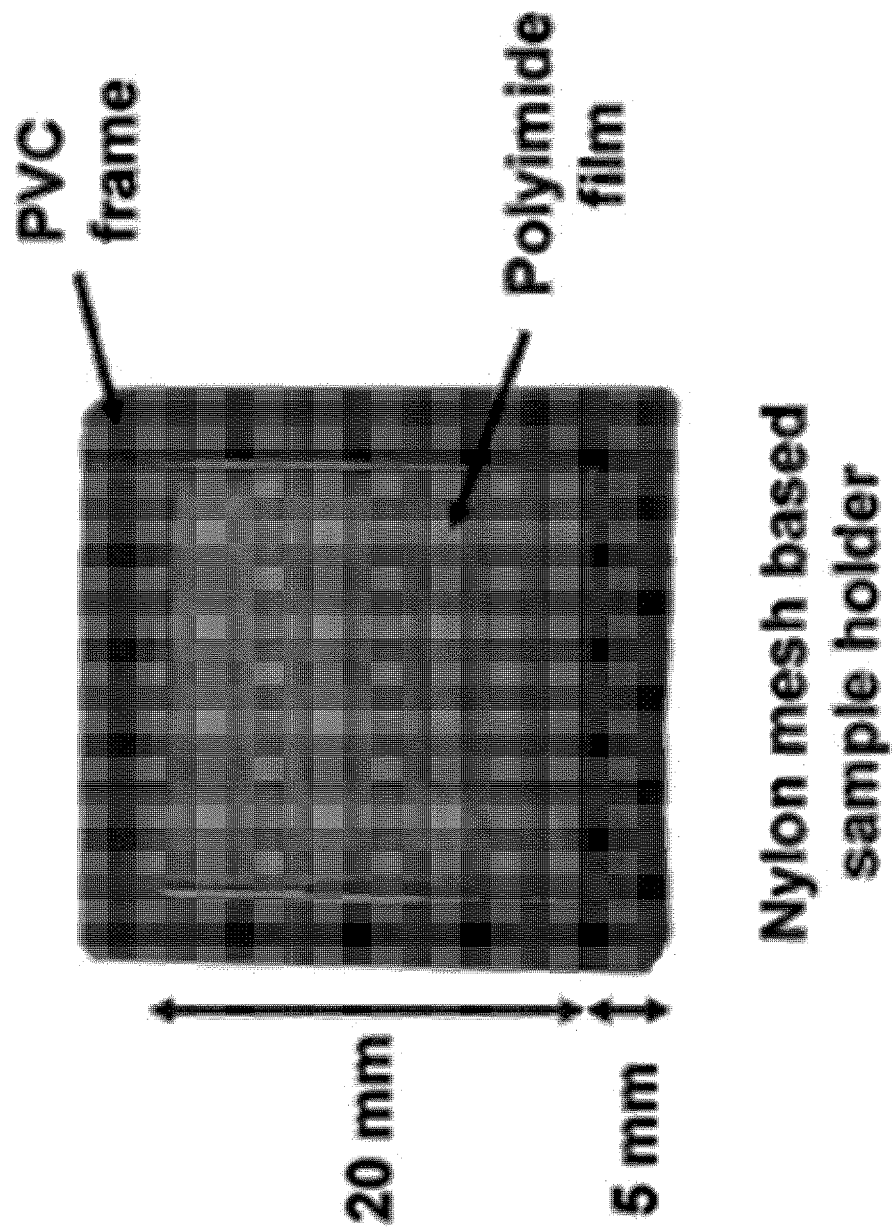
FIG. 3 shows the appearance of the nylon mesh-based crystal sample holder used in an FT-SFX experiment.
Figure 4:
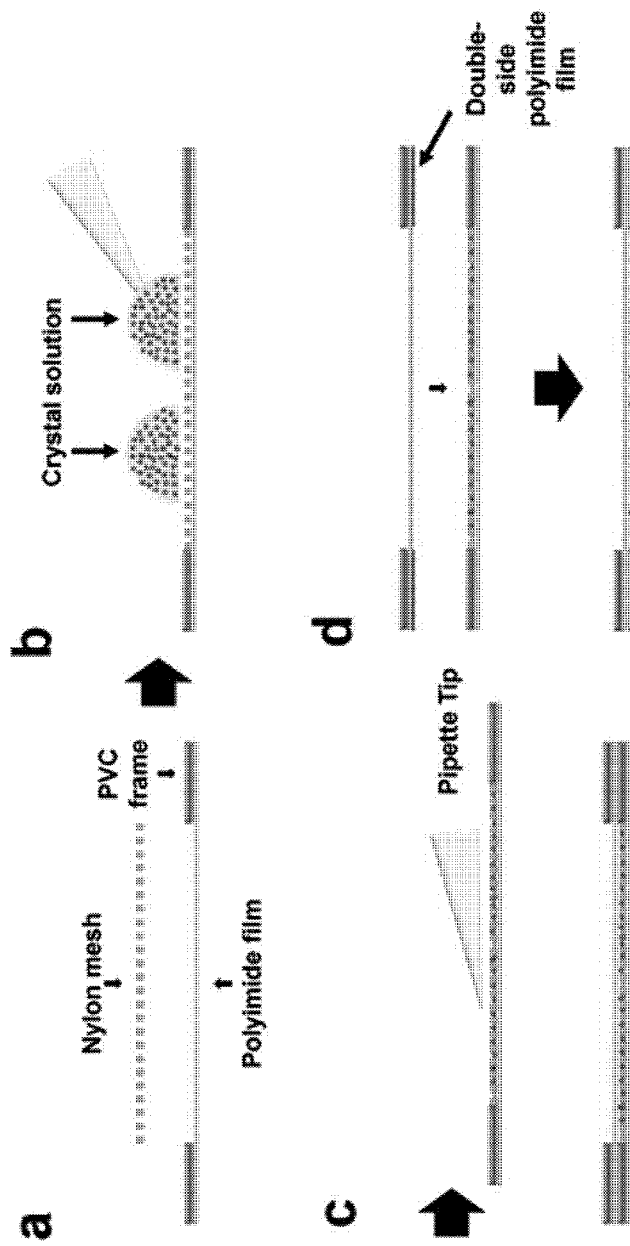
FIG. 4 illustrates a method of loading a crystal sample using a sample holder of the present invention.

The sample holder manufactured through the above procedure can scan 400 points horizontally and vertically in raster scanning performed at 50-μm intervals, and this setting was designed to collect a total of 160,000 diffraction images on a single nylon mesh chip (see FIG. 3).

Example 2. Crystal Sample Loading

Sample loading in the nylon-based sample holder was performed by the following method (see FIGS. 4A to 4D).
1) A PVC frame of a first film cover was placed to face up, a polyimide film was placed downward, and then a nylon mesh was placed inside the PVC frame.
2) A protein crystal solution (80 μl) was dispensed onto the nylon mesh.
3) The crystal solution was well spread with a pipette such that a crystal sample was uniformly distributed in holes of the mesh.
4) To prevent evaporation of the crystal solution, the crystal-dispensed nylon mesh was immediately covered with a polyimide film of an upper layer, and a double-sided polyimide tape was used to seal between the upper and lower polyimide films.

Figure 5:
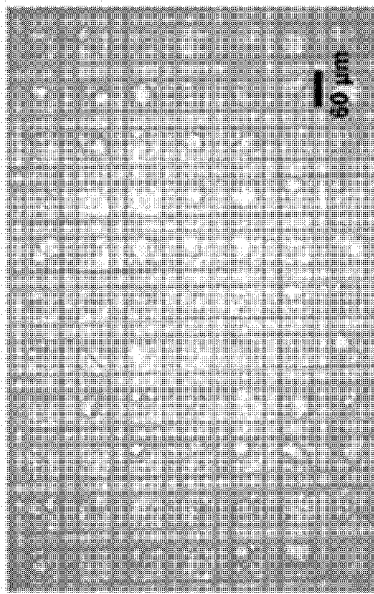
FIG. 5 is an image showing that a crystal sample is sealed after being loaded in a sample holder of the present invention.
Figure 5:
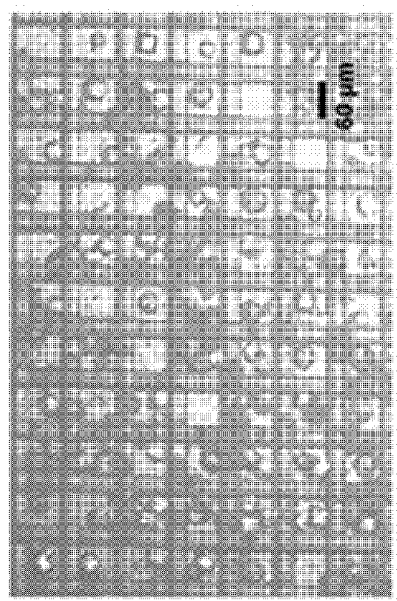

The above procedure was performed with lysozyme (30 to 40 μm) or glucose isomerase (less than 60 μm) as a sample, and as a result of distribution of the crystal sample using the nylon mesh with 60-μm mesh pores in consideration of a crystal size, as shown in FIG. 5, it was confirmed that each sample was uniformly distributed in the mesh structure.

Example 3. Observation of Sample Holder After XFEL Penetration

Figure 6:
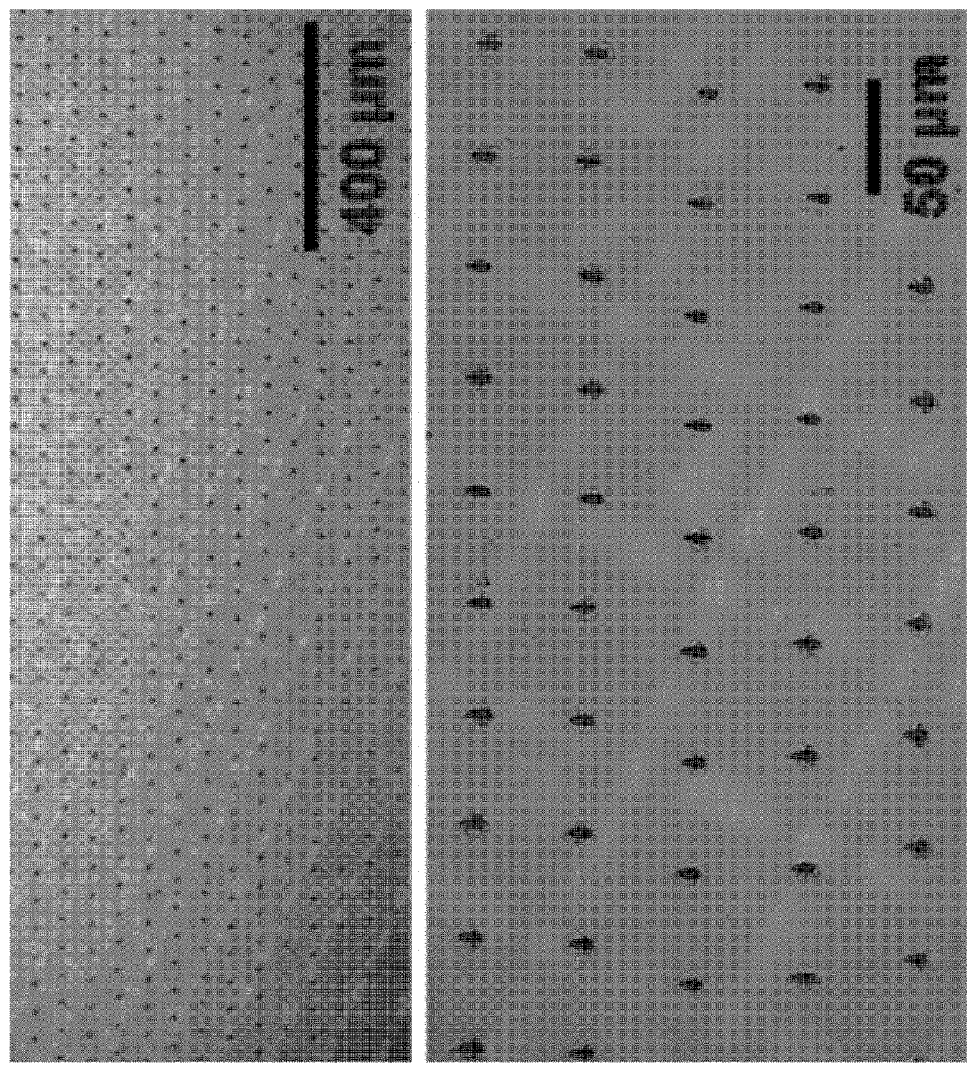
FIG. 6 shows holes formed on the outer surface of a polyimide film after X-ray transmission through a sample holder of the present invention.

As a result of observing the sample holder manufactured by the method in Example 2 after data collection using XFEL, as shown in FIG. 6, a hole in the surface of the polyimide film was observed, and indicates the site through which XFEL passed. During the data collection, a motion stage was set to mechanically perform raster scanning at 50-μm intervals, and a distance between holes of the polyimide film through which XFEL passed was the same as that of the motion stage in the software. The beam size after focusing using a KB mirror at the sample position was 4×8 μm (FWHM), and the size of the surface hole of polyimide created by XFEL penetration was approximately 6×10 μm.

Figure 7:
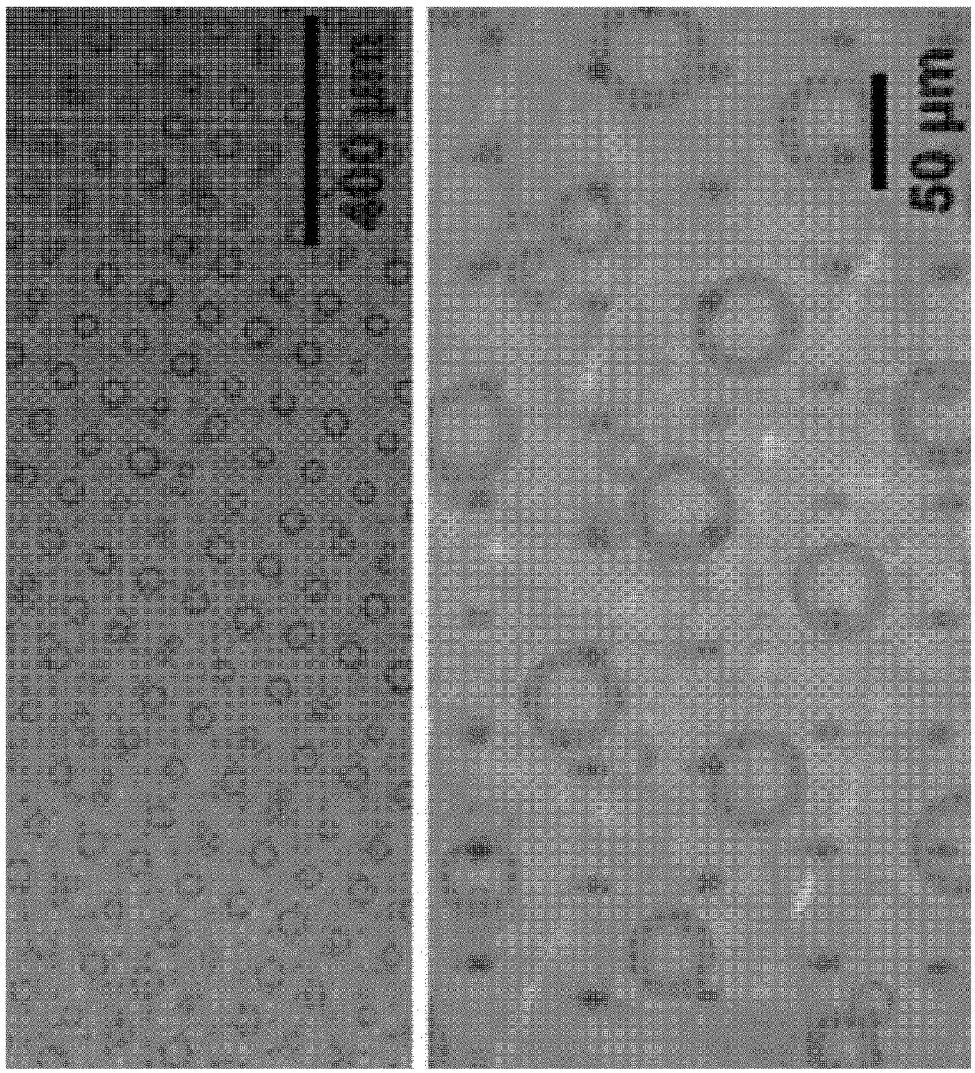
FIG. 7 shows bubbles generated in a polyimide film after-ray transmission through a sample holder of the present invention.

In addition, as shown in FIG. 7, it was confirmed that a bubble was formed inside the mesh pore enclosed by the polyimide membrane at the site through which XFEL passed. This is considered a gas bubble generated by radiation damage after X-rays passed through the sample.

Example 4. Data Collection and Structural Analysis Using Nylon Mesh-Based Sample Holder Raster scanning was performed at 50-μm intervals to avoid exposure of the surrounding crystal sample to a physical change when XFEL passed through the sample holder. The maximum available area of the nylon mesh is 20 mm×20 mm, and while a maximum of 160,000 images may be collected, in this example, diffraction data at a site far away from the PVC frame was collected. XFEL with a pulse width of fs for a photon energy of 9.7 keV was used in the experiment, and the application of the nylon mesh-based sample holder was demonstrated using lysozyme and glucose isomerase crystal samples as below.

1) Lysozyme Crystal Sample

In an X-ray diffraction experiment using a crystal sample, 133,107 images were obtained using one nylon mesh sample holder for 1 hour 14 minutes and 24 seconds. Subsequently, 118,985 hit images (hit rate=89.39%) were obtained using the Cheetah program, and after optimization of detector geometry, 80,177 indexed images (indexing rate=67.38%) were obtained. Post-refinement was performed using partialator from the CrystFEL program, and finally, diffraction data at 1.65 Å was collected.

Figure 8A:
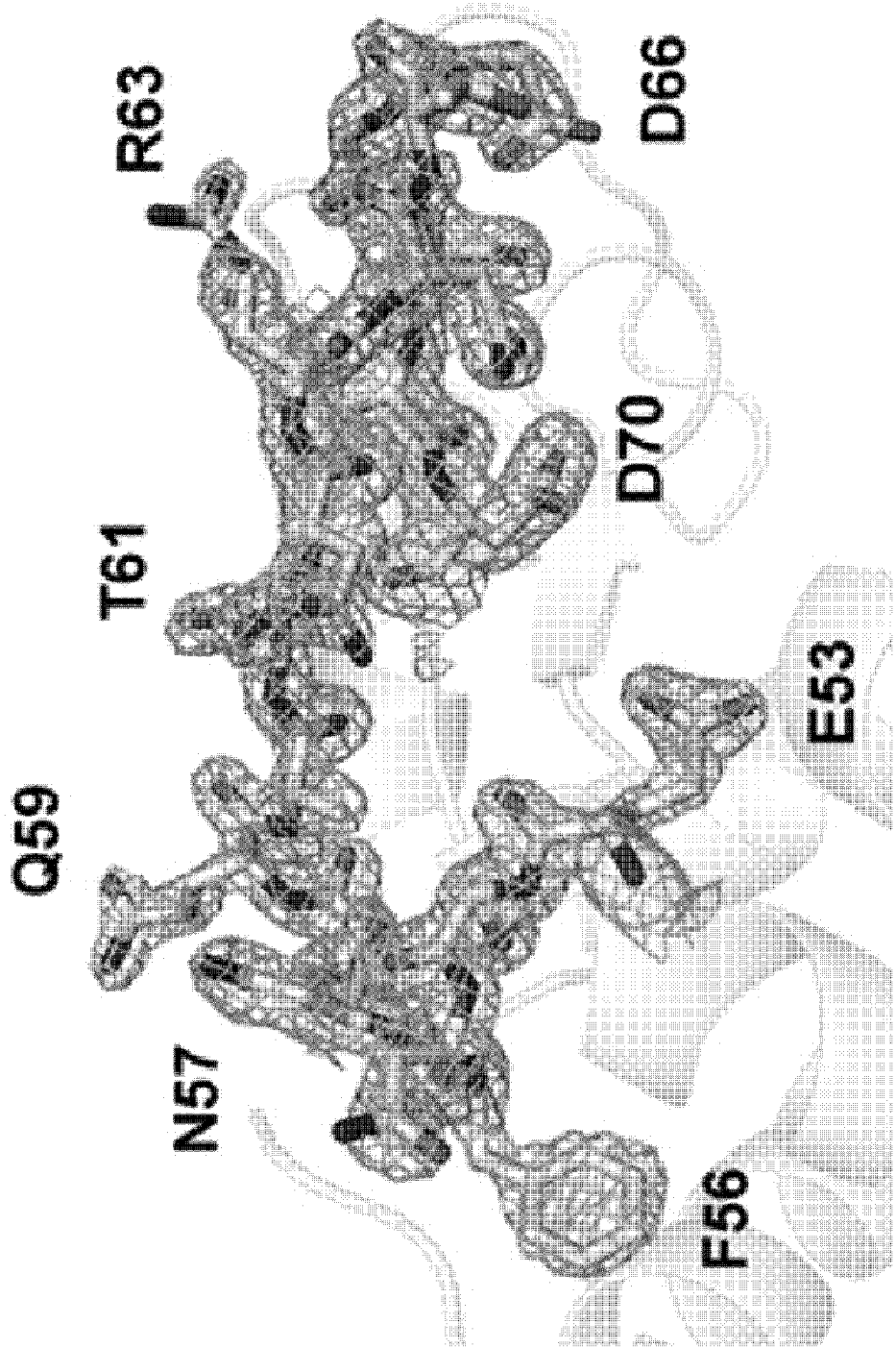

The overall signal-to-noise ratio (signal/noise) and completeness were 6.61 and 100%, respectively, and the overall $R_{split}$ and Pearson correlation coefficient (CC*) were 10.28 and 99.62%, respectively. The final model was defined as a 1.65 Å structure, and $R_{work}$ and $R_{free}$ were 19.93% and 22.75%, respectively, and as shown in FIG. 8A, the electron density map of lysozyme obtained from this experiment was very clearly observed from Lys1 to Leu129, excluding the C-terminus.

2) Glucose Isomerase Crystal Sample

In an X-ray diffraction experiment using a crystal sample, 134,325 images were obtained using a holder of one nylon mesh sample for 1 hour 14 minutes and 30 seconds, and data processing was applied in the same manner as in the above-described lysozyme experiment. A total of 79,805 hit images (hit rate=59.41%) were obtained, and 29,157 indexed images (indexing rate=36.53%) were obtained. Diffraction data until 1.75 Å was used.

Figure 8B:
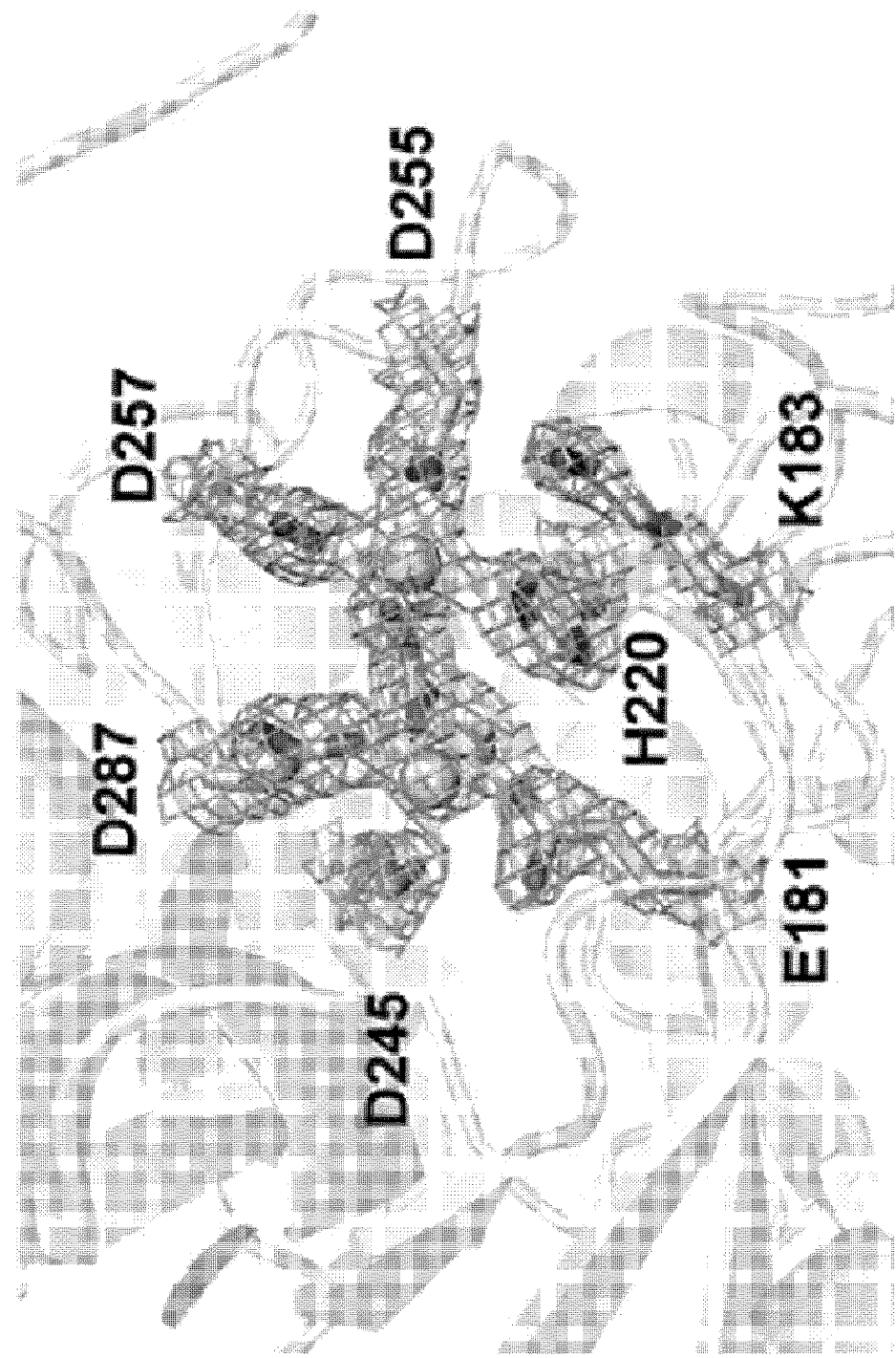

The overall signal-to-noise ratio (signal/nose ratio) and completeness were 4.03 and 100%, respectively, and the overall $R_{split}$ and CC* were 21.63% and 100%, respectively. The final model was 1.75 Å data, $R_{work}$ and $R_{free}$ were 18.18% and 20.30%, respectively, and as shown in FIG. 8B, the electron density map of glucose isomerase was very clearly observed from Tyr3 to Gly388.

Table 1 below shows the data collection and refinement statistics in this experiment.

TABLE 1

| Data collection | Lysozyme | Glucose isomerase |
|---|---|---|
| Energy (eV) | 9700 | 9700 |
| Photons/pulse | ~5 × 10$^{11}$ | ~5 × 10$^{11}$ |
| Pulse width | 20 fs | 20 fs |
| Space group | P4$_3$2$_1$2 | I222 |
| Cell dimensions | | |
| a, b, c (Å) | 78.22, 78.22, 37.76 | 93.05, 99.00, 101.92 |
| No. collected diffraction images | 133107 | 134325 |
| No. of hits | 118985 | 79805 |
| No. of indexed images | 80177 | 29157 |
| No. of unique reflections | 29127 | 47861 |
| Resolution (Å) | 80.0-1.65 (1.71-1.65) | 71.94-1.75 (1.81-1.75) |
| Completeness | 100.0 (100.0) | 100.0 (100.0) |
| Redundancy | 4660.8 (962.2) | 356.8 (125.2) |
| I/σ (I) | 6.61 (1.36) | 4.03 (1.45) |
| R$_{split}$ | 10.28 (78.73) | 21.63 (64.71) |
| CC* | 99.62 (73.90) | 98.12 (94.15) |
| Wilson B factor (Å$^2$) | 50.38 | 43.81 |
| Refinement statistics | | |
| Resolution (Å) | 78.22-1.65 | 71.01-1.75 |
| R$_{factor}$/R$_{free}$ (%) | 19.93/22.75 | 18.18/20.30 |
| B-factor (Averaged) | | |
| Protein | 43.40 | 40.06 |
| Metal | 41.55 | 30.96 |
| Water | 45.70 | 43.24 |
| R.m.s. deviations | | |
| Bond lengths (Å) | 0.010 | 0.010 |
| Bond angles (°) | 1.071 | 1.078 |
| Ramachandran plot (%) | | |
| favored | 98.43 | 96.9 |
| allowed | 1.57 | 2.8 |
| outlier | | 0.3 |

Example 5. Analysis of X-Ray Scattering from Nylon

Figure 9:
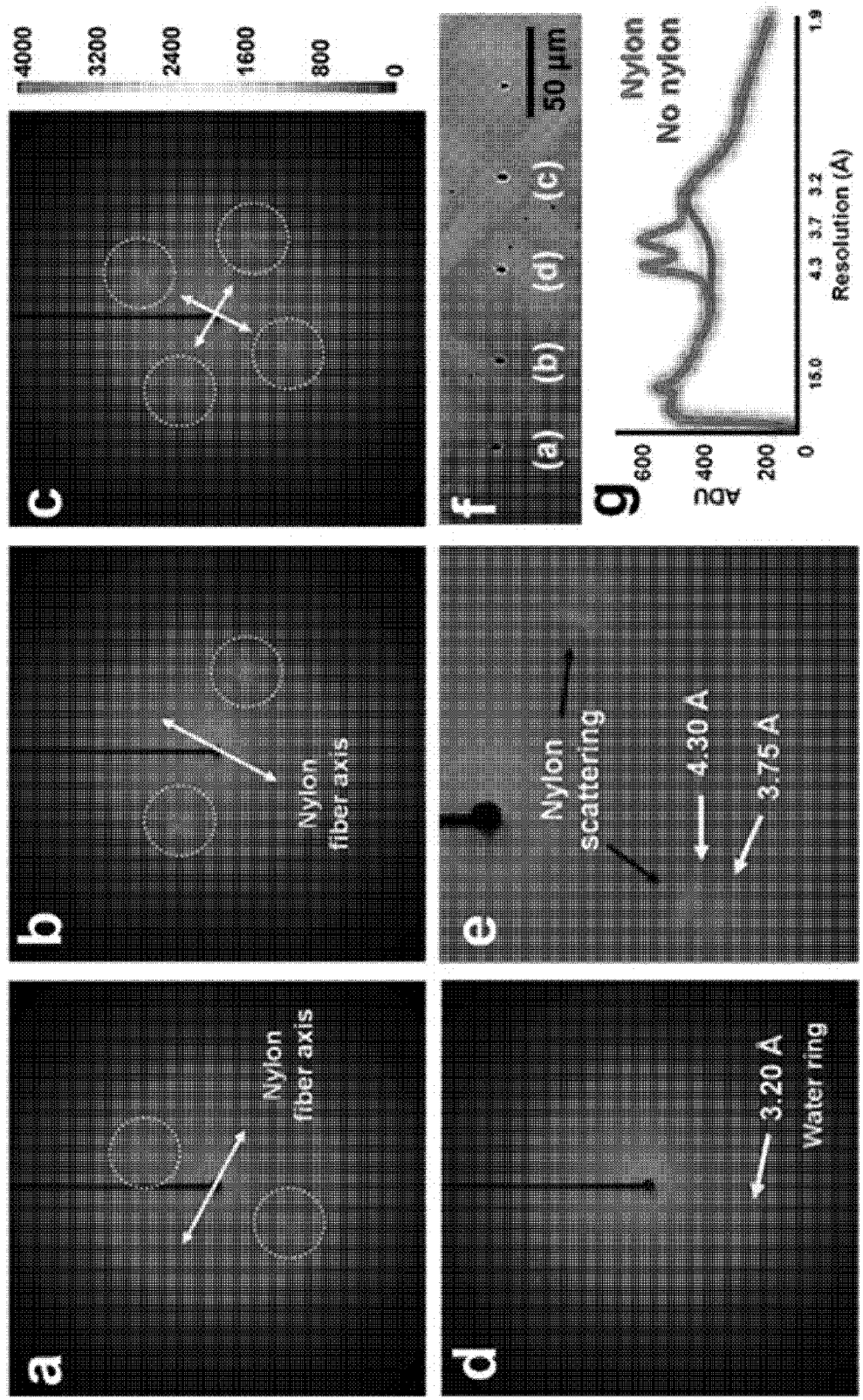
FIG. 9 shows the result of X-ray scattering analysis of a sample holder of the present invention.

While a crystal structure was successfully determined using a nylon mesh enclosed by a polyimide film through Example 4, for future efficient application, background scattering of a nylon material was analyzed. Diffraction images were classified into four image patterns, in which the first background scattering pattern was observed at 3.75 and 4.30 Å in both directions from the beam center (see FIG. 9A). The pattern is the same as an X-ray scattering tendency shown when a common fiber is exposed to X-rays, and the direction of two scattering points is parallel to an actual nylon fiber axis. The second pattern is a 90° rotation of the first pattern, indicating that the direction of the nylon fiber was rotated 90° (see FIG. 9B). The third background scattering pattern was observed in four directions with respect to the beam center (see FIG. 9C). This indicates the crossing point of nylon in the mesh. The fourth pattern does not show nylon scattering because XFEL passed through a nylon mesh hole (see FIG. 9D). The expected nylon transmission positions for the four diffraction patterns are shown in FIG. 9E. The scattering of nylon was shown at 3.75 Å and 4.30 Å, and the intensity detected by a detector was approximately 600 ADU (see FIG. 9F). Compared to the data passing through a mesh pore, the scattering intensity in actual nylon corresponds to approximately 200 ADU, which is a low level of scattering that does not affect data processing.

It should be understood by those of ordinary skill in the art that the above description of the present invention is exemplary, and the exemplary embodiments disclosed herein can be easily modified into other specific forms without departing from the technical spirit or essential features of the present invention. Therefore, the exemplary embodiments described above should be interpreted as illustrative and not limited in any aspect.

INDUSTRIAL APPLICABILITY

A sample holder of the present invention may be manufactured by a very simple process at low cost, compared to a conventional sample holder, and since the sample holder uses a material that transmits X-rays, while collecting X-ray diffraction data from an accelerator beamline, there is no physical or chemical effect on other equipment in the vicinity. Therefore, since the beamline may be stably operated, beamline efficiency may be increased, and further, since scattering from a mesh does not affect diffraction data processing, as raster scanning is possible, many diffraction images can be obtained with a small-sized chip, thereby increasing space utilization inside a sample chamber. In addition, since the sample holder is sealed by a film, there is no problem of evaporation of a crystallization solution even when stored in air for a long time. In addition, the sample holder may be arbitrarily installed in any device including X and Y stages to collect diffraction data. As a result, since it is generally easier to use the sample holder of the present invention than a previously reported sample holder, it is expected that the sample holder of the present invention is highly likely to be applied in various fields of fixed-target serial crystallography research using various samples. Therefore, the sample holder has industrial applicability.

The invention claimed is:

1. A sample holder for loading a crystal sample for X-ray serial crystallography, comprising:
  a first film cover which comprises a frame enclosing a first sample evaporation preventing film;
  a mesh structure in which mesh pores are formed to carry and fix a crystal sample; and
  a second film cover including a frame enclosing a second sample evaporation preventing film,
  wherein the mesh structure is included between the first film cover and the second film cover, and
  wherein a material for the mesh structure is nylon.

2. The sample holder of claim 1, wherein the sample evaporation preventing films and the frames enclosing the films in the first film cover and the second film cover, are fixed with an adhesive member.

3. The sample holder of claim 2, wherein the adhesive member is capable of double-sided adhesion.

4. The sample holder of claim 3, wherein the adhesive member capable of double-sided adhesion is a polyimide tape.

5. The sample holder of claim 1, wherein the frame of the first film cover is placed on an upper part of the first sample evaporation preventive film, and the mesh structure is placed in the frame of the first film cover.

6. The sample holder of claim 1, wherein a material for the sample holder is a material that transmits X-rays.

7. The sample holder of claim 1, wherein the sample holder has a width of 20 to 50 mm, a length of 20 to 50 mm, and a thickness of 1 to 5 mm.

8. The sample holder of claim 1, wherein the mesh pores formed in the mesh structure have a size of 10 to 200 μm.

9. The sample holder of claim 1, wherein a material for the sample evaporation preventing film of the first film cover or the second film cover is one or more materials selected from the group consisting of polyimide, polyethylene terephthalate, polyetheretherketone, poly(4,4'-oxydiphenylene-pyromellitimide) and biaxially-oriented polyethylene terephthalate (BoPET).

10. The sample holder of claim 1, wherein the sample evaporation preventing film of the first film cover or the second film cover has a thickness of 100 nm to 30 μm.

11. The sample holder of claim 1, wherein a material for the frame of the first film cover or the second film cover is one or more materials selected from the group consisting of polyvinyl chloride (PVC), polyethylene terephthalate (PET), polyester, and vinyl.

12. The sample holder of claim 1, wherein the frame of the first film cover or the second film cover has a thickness of 0.1 to 0.5 mm.

13. The sample holder of claim 1, wherein a crystal sample carried in the sample holder is one or more selected from the group consisting of a protein crystal, a nucleic acid crystal, a nano crystal, and a small molecule crystal.

14. The sample holder of claim 1, wherein the sample holder is used in a fixed-target serial femtosecond crystallography (FT-SFX) experiment using X-Ray Free-Electron Laser (XFEL) or a fixed-target serial millisecond crystallography (FX-SMX) experiment using synchrotron X-rays.

15. A method of preparing a sample for X-ray serial crystallography experiment, comprising:
　(a) preparing a mesh structure in which a sample is carried to be positioned on the top of the first film cover of claim 1; and
　(b) sealing, between the first film cover and the second film cover, the mesh structure in step (a) by fixing a second sample evaporation preventing film of the second film cover of claim 1 and a frame of the first film cover in step (a) with an adhesive member,
　wherein a material for the mesh structure is nylon.

16. A method of preparing the sample holder of claim 1 for loading a crystal sample for X-ray serial crystallography, comprising:
　(a) preparing a first film cover having a frame enclosing a first sample evaporation preventing film, a second film cover having a frame enclosing a second sample evaporation preventing film, and a mesh structure in which mesh pores for carrying and fixing a crystal sample are formed; and
　(b) placing the mesh structure in step (a) between the first film cover and the second film cover,
　wherein a material for the mesh structure is nylon.

* * * * *